(No Model.) 2 Sheets—Sheet 1.

J. B. FARRAR.
TIRE HOLDER FOR FORGES.

No. 593,088. Patented Nov. 2, 1897.

WITNESSES:
M. D. Bloudel
P. B. Turpin.

INVENTOR
James B. Farrar.
BY Munn & Co.
ATTORNEYS.

(No Model.) 2 Sheets—Sheet 2.
J. B. FARRAR.
TIRE HOLDER FOR FORGES.
No. 593,088. Patented Nov. 2, 1897.
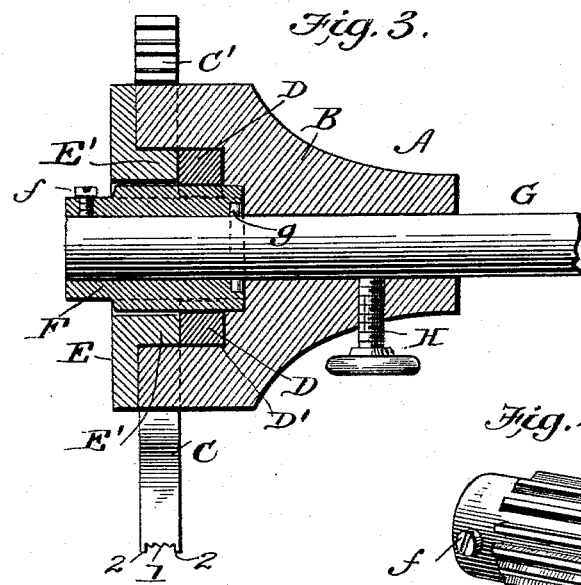
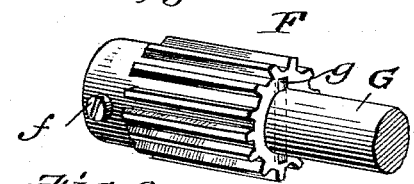
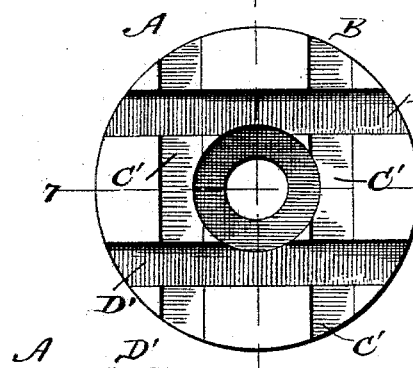
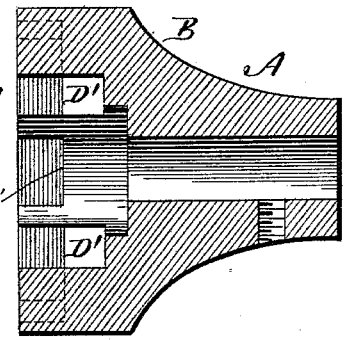
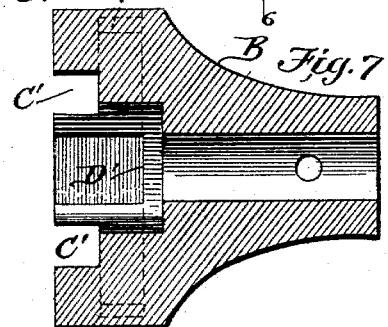
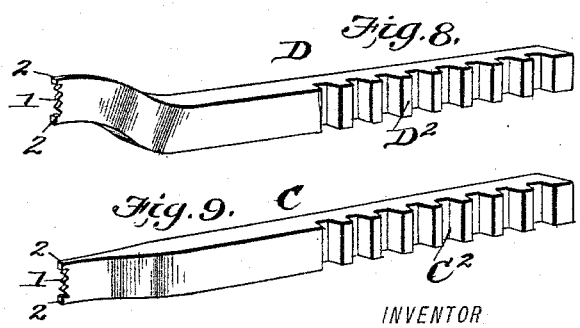
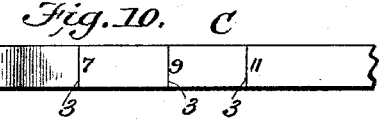
WITNESSES:
M. S. Blondel
P. B. Turpin
INVENTOR
James B. Farrar.
BY Munn & Co.
ATTORNEYS.

UNITED STATES PATENT OFFICE.

JAMES B. FARRAR, OF WILMINGTON, NORTH CAROLINA.

TIRE-HOLDER FOR FORGES.

SPECIFICATION forming part of Letters Patent No. 593,088, dated November 2, 1897.

Application filed May 1, 1897. Serial No. 634,784. (No model.)

*To all whom it may concern:*

Be it known that I, JAMES B. FARRAR, residing at Wilmington, in the county of New Hanover and State of North Carolina, have invented a new and useful Improvement in Tire-Holders for Forges, of which the following is a specification.

My invention is a machine for holding tires while the same are being heated in a forge-fire, and has for its objects, among other improvements, to provide an expansible head or holder for the tire, so the same may be readily clamped in place, to so support such holder that it may be turned to expose every portion of the tire to the heating action, and to support the shaft carrying the holder so it may be adjusted vertically to set tires of different diameters in proper relation to the forge-fire.

The invention consists in certain novel constructions and combinations of parts, as will be hereinafter described, and pointed out in the claims.

Figure 1:
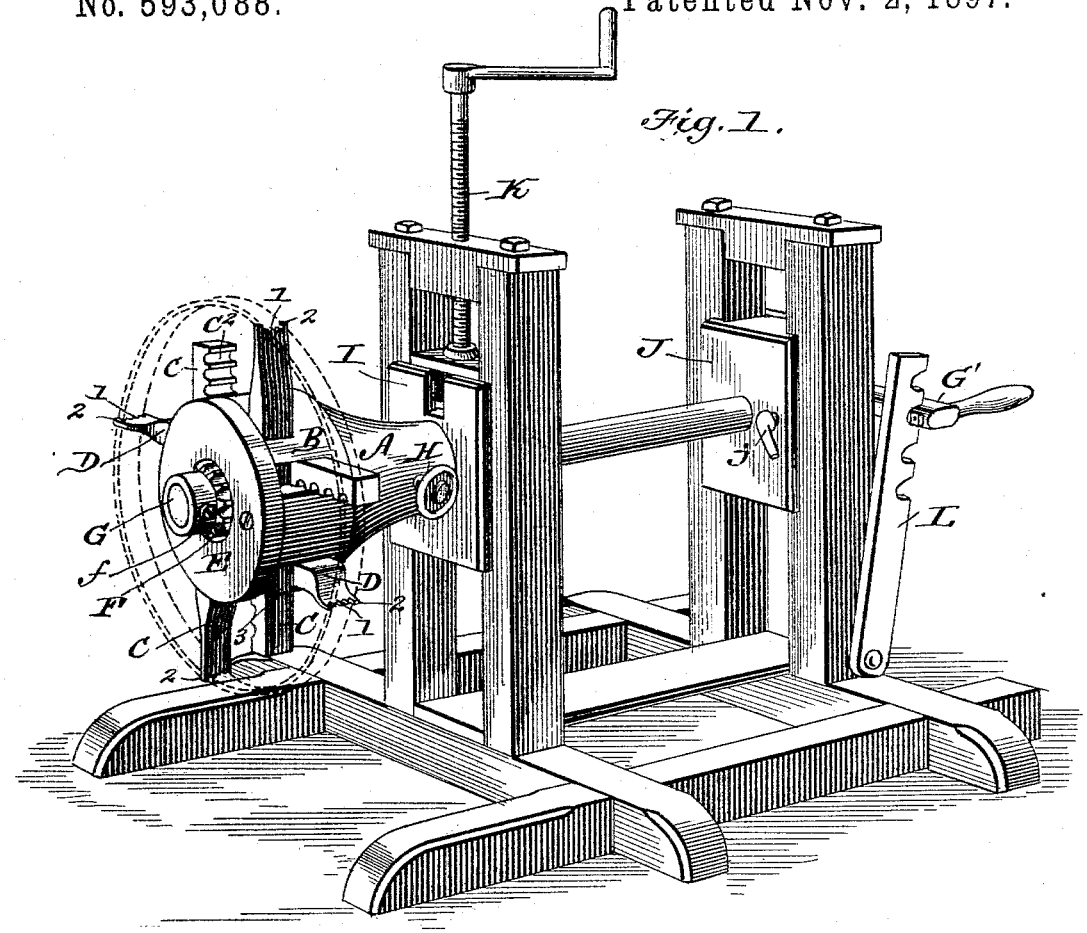
Figure 2:
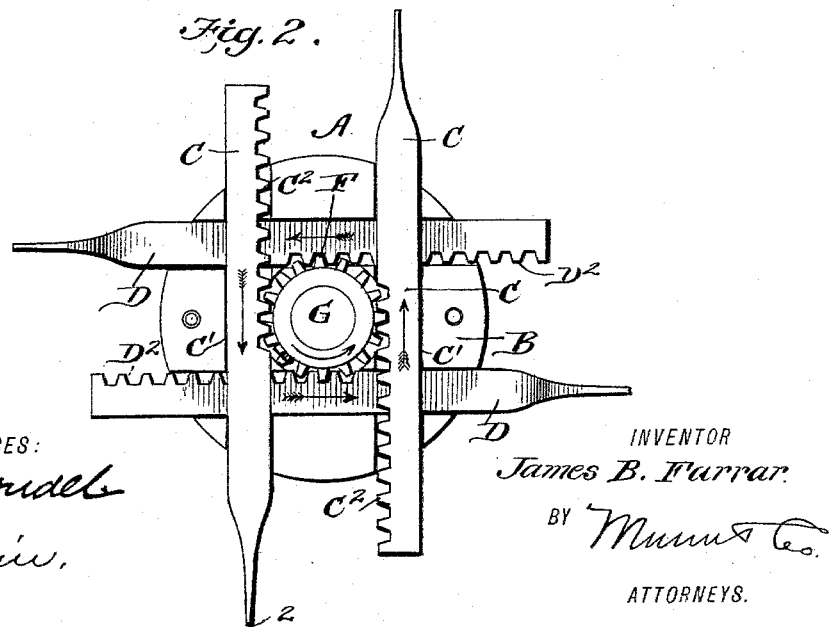

In the drawings, Figure 1 is a perspective view of my machine. Fig. 2 is a face view of the expansible head, the cap being removed. Fig. 3 is a sectional view of the head. Fig. 4 is a detail view of the pinion and shaft. Figs. 5, 6, and 7 are detail views of the body of the head, and Figs. 8, 9, and 10 are detail views of the arms.

In carrying out my invention I provide an expansible head A, adapted to bind within the tire and hold the same. This head A comprises a body B and arms C and D, supported by and moving out and in from said body, together with means for operating said arms. I provide the arms in a plurality of sets or series, the arms C of one set being straight and the arms D of the other set being bent between their ends, so their outer ends may lie in the same plane as those of the arms C, while their inner ends lie in different plane, so the inner ends of the arms C and D may lie alongside and slide past each other. The body B is provided with ways C' for the arms C and with ways D' for the arms D, the ways D' being deeper than the ways C', as shown. The arms are fitted in these ways, as shown, and are held by means of the cap E, which is fitted thereover and held in any suitable manner to the body B. This cap E is provided with lugs E', which project into the ways D' and bear against the arms D, holding the same in place and avoiding too much friction between such arms and the arms C. These arms C and D are operated in and out by means of a pinion F, which is supported on the shaft G and is meshed with rack-teeth $C^2$ and $D^2$ on the arms C and D, so the turning of the head on the pinion or of the pinion in the head will operate to move the arms C and D in and out, as may be desired. To lock the head in any desired adjustment, I provide a suitable clamp, which may be a set-screw H, turned through the hub of the body B and bearing against the shaft, as shown.

At their outer ends the arms C and D are fitted to engage within the tire, being preferably provided with teeth 1 and 2, the teeth 1 binding within the tire and the end teeth 2 projecting alongside the tire and preventing any displacement thereof.

In securing the pinion F upon the shaft G it is preferred to provide the latter with a cross-pin $g$, having projecting ends which seat in sockets in the inner end of the pinion and hold such pinion from turning loosely on the shaft, a screw $f$ turning through the pinion against the shaft and holding said pinion from endwise movement. The shaft is supported in a suitable frame and preferably so it can be set higher or lower. In the construction shown the frame is provided with sliding boxes I and J, a screw K being provided for setting the box I up and down, and a clamp $j$, shown as a set-screw, being provided for holding the box J in any desired adjustment.

To the frame is pivoted a lock-bar L, which is arranged to engage the handle G' of the shaft G when it is desired to lock the said shaft from turning. This may be found useful when it is desired to manipulate the expanding head or some part thereof and at the same time prevent any turning of the shaft.

In operation, the machine being placed in suitable position alongside the forge, the expanding head may be loosened on the shaft and the shaft properly turned to set the arms out to a position nearly equaling the diameter of the tire to be heated. For convenience I prefer to mark on one or more of the arms C and D graduations, as shown at 3, corresponding to the standard sizes of tire. When the arms have been so adjusted, a slight further turn of the shaft will cause said arms to bind within the tire which has been previously applied to such arms, and the head may be clamped in such position by tightening the screw H, before described. By means of the adjusting devices before described the shaft G and the head with the tire in place can now be adjusted up or down to properly expose the tire to the forge-fire, and when this adjustment is secured the shaft may be slowly turned to secure a proper exposure of every part of the tire to the fire.

This invention, it will be seen, enables a smith to properly heat a tire right at the forge-fire in a simple and convenient manner.

Having thus described my invention, what I claim, and desire to secure by Letters Patent, is—

1. In a tire-holder, an expansible head comprising the body having ways for the arms, one set of such ways being deeper than the other, the arms sliding in said ways means for operating said arms and the cap fitted over said ways and having lugs projecting into the deeper ways, substantially as described.

2. In a tire-holder the combination of a holder having a body and movable arms, a shaft which may be turned in said body to operate the arms and a screw by which to positively lock the body to the shaft substantially as described.

3. A tire-holder comprising the expansible holder having arms, the shaft carrying said holder and having a pinion meshed with said arms whereby to expand and contract the holder, and an adjustable support for said shaft whereby it may be set up and down, substantially as described.

4. The tire-holder herein described consisting of the frame, having movable boxes, means for adjusting one of the boxes, a clamp for locking the other box, the shaft turning in said boxes and having a crank-handle and a rack-wheel, the lock-bar pivoted to the frame and arranged to engage the crank-handle, and the head supported on the shaft and having arms provided with teeth meshed by and arranged to be operated by the pinion of the shaft substantially as described.

5. A tire-holder comprising the body, the arms movable in and out therein, the shaft which may be turned in said body to operate the arms, the frame and the bearings for said shaft adjustable vertically in said frame whereby the shaft may be set higher or lower according to the size of the tire substantially as shown and described.

6. A tire-holder comprising the holder having a body and arms movable in and out therein, the shaft supporting said body and which may be turned therein to operate the arms, means by which the shaft may be locked from turning in said body, the frame having bearings for the shaft in which the latter may turn and devices by which the shaft may be held from turning in such bearings substantially as shown and described.

7. A tire-holder for forges comprising the frame, having vertically-adjustable bearings, the shaft supported in said bearings whereby it may be set up and down and the head supported on said shaft and expansible substantially as shown and described.

JAMES B. FARRAR.

Witnesses:
SOLON C. KEMON,
PERRY B. TURPIN.